United States Patent [19]

Pekala

[11] Patent Number: 5,086,085
[45] Date of Patent: Feb. 4, 1992

[54] MELAMINE-FORMALDEHYDE AEROGELS

[75] Inventor: Richard Walter Pekala, Pleasant Hill, Calif.

[73] Assignee: The United States of America as represented by the Department of Energy, Washington, D.C.

[21] Appl. No.: 717,581

[22] Filed: Jun. 19, 1991

Related U.S. Application Data

[62] Division of Ser. No. 684,051, Apr. 11, 1991.

[51] Int. Cl.$^5$ ............................ C08G 12/00; C08J 9/28
[52] U.S. Cl. ..................................... 521/187; 521/181
[58] Field of Search ............................................ 521/187

[56] References Cited

U.S. PATENT DOCUMENTS 4,873,218 10/1989 Pekala .................................. 521/181
4,997,804 3/1991 Pekala .................................. 521/181

Primary Examiner—Morton Foelak
Attorney, Agent, or Firm—Henry P. Sartorio; L. E. Carnahan; William R. Moser

[57] ABSTRACT

Organic aerogels that are transparent and essentially colorless are prepared from the aqueous, sol-gel polymerization of melamine with formaldehyde. The melamine-formaldehyde (MF) aerogels have low densities, high surface areas, continuous porsity, ultrafine cell-/pore sizes, and optical clarity.

8 Claims, 2 Drawing Sheets

MELAMINE-FORMALDEHYDE AEROGELS

The United States Government has rights in this invention pursuant to Contract No. W-7405-ENG-48 between the United States Department of Energy and the University of California for the operation of the Lawrence Livermore National Laboratory.

This is a division of application Ser. No. 684,051, filed Apr. 11, 1991.

BACKGROUND The invention described herein pertains generally to organic gels and more specifically to melamine-formaldehyde (MF) aerogels and methods for their preparation.

Aerogels are a unique class of ultrafine cell size, low density, open-cell foams. Aerogels have continuous porosity and a microstructure composed of interconnected colloidal-like particles or polymeric chains with characteristic diameters of 100 Å (angstrom). The microstructure of aerogels is responsible for their unusual acoustic, mechanical, optical and thermal properties. [Fricke, *Sci. Am.*, 285(5): 92 (1988); Fricke, in *Sol-Gel Science and Technology* (Aegerter et al., eds.) (World Scientific Publishing, N.J.) 482 (1989).] The microstructure imparts high surface areas to aerogels, for example, from about 350 $m^2/g$ to about 1000 $m^2/g$. Their ultrafine cell/pore size minimizes light scattering in the visible spectrum, and thus, aerogels can be prepared as transparent, porous solids. Further, the high porosity of aerogels makes them excellent insulators with their thermal conductivity being approximately 100 times lower than that of the fully dense matrix. Still further, the aerogel skeleton provides for the low sound velocities observed in aerogels. [*Aerogels* (Fricke ed.) (Springer-Verlag N.Y. 1988).]

As a result of their high porosity, aerogels exhibit elastic moduli many orders of magnitude smaller than their full density analogs. A simple scaling law relates the aerogel modulus to its density ($\rho$), that is, $E = c\rho^n$. The scaling constant, $n$, and prefactor, $c$, are sensitive to variations in the aerogel microstructure.

Traditional aerogels are inorganic (for example, silica, alumina or zirconia aerogels), made via the hydrolysis and condensation of metal alkoxides, for example, tetramethoxy silane [Teichner et al., *Adv. Coll. Interf. Sci.*, 245 (1976); Brinker et al., J. Non-Cryst. Solids, 48: 47 (1982); *J. Non-Cryst. Solids*, 63: 45 (1984)].

Recently, organic aerogels from the sol-gel polymerization of resorcinol (1,3 dihydroxy benzene) with formaldehyde under alkaline conditions have been developed as disclosed in U.S. Pat. No. 4,873,218, issued Oct. 10, 1989, to Richard W. Pekala. [Pekala et al., *J. de Physique, Colloque Suppl.*, 50(4): (4–33) (1989); Pekala, *J. Mat. Sci.*, 24: 3221 (1989); Pekala and Kong, *Polym. Prpts.*, 30(1): 221 (1989); and Pekala and Stone, Polym. Prpts., 29(1): 204 (1988).]

Although the resorcinol-formaldehyde aerogels (RF aerogels) exhibit minimal light scattering, they are dark red in color and have a large absorption coefficient within the visible spectrum. The color centers present in the RF aerogels result from oxidation products (for example, quinones) formed during the polymerization. Their presence has limited the use of the RF aerogels for certain optical applications where the material needs to transmit light and be essentially colorless, that is, non-absorptive in the visible spectrum.

The present invention overcomes the optical limitations of RF aerogels by providing organic aerogels of low density and high surface area, produced by the sol-gel polymerization of melamine with formaldehyde; such aerogels are not only transparent, but also essentially colorless having a slightly bluish tinge.

The MF aerogels are prepared by the aqueous, sol-gel polymerization of melamine (2,4,6 triamino s-triazine) with formaldehyde followed by supercritical extraction. Described herein are processes for preparing MF aerogels which processes are different from those used to prepare RF aerogels, primarily in that acidic conditions are necessary to promote condensation of intermediates in the polymerization process leading to gel formation. Synthetic conditions, for example, reaction time and pH, affect the density, transparency and microstructure of the resultant MF aerogels. Representative densities of the MF aerogels are low from about 100 mg/cc to about 800 mg/cc, preferably from about 100 mg/cc to about 750 mg/cc; and the surface area is high, for example, about 1000 $m^2/g$.

Kistler described organic foams prepared from nitrocellulose, cellulose, agar and egg albumin using a supercritical drying procedure. [*Nature*, 127: 741 (1931).]

Examples of commercially available "low-density" materials are plastic "blown cell" foams, such as, polyurethane cushions and polystyrene coffee cups. Asymmetric membranes and filters, on the other hand, are representative of commercially available "microcellular" materials. The processes used to make such products are generally not suitable for making aerogels, however, because they are limited by a trade off between density and cell size. That is, such processes produce relatively low density products only at the expense of increased cell size, or produce products having small cell size at the expense of those products having increased density. Aerogels, on the other hand, have both low density and small cell size, as well as meeting other requirements of various applications (for example, composition, homogeneity, size and strength).

Differentiated from the organic aerogels, such as, RF and MF aerogels, are the relatively macrocellular (having large cell sizes) foamed organic polymers and organic foam composite materials that are well-known and used in the insulation, construction and similar industries. Such foams are not generally suitable for applications where both very low density and ultrafine cell sizes are needed, such as in many high-energy physics applications, or as parts for inertial confinement fusion targets. A requirement for such organic materials is not only very low density, but generally at least over an order of magnitude smaller cell size than foams produced using other conventional techniques such as the expansion of polymer/blowing agent mixtures, phase-separation of polymer solutions and replication of sacrificial substrates, to name a few. Some of such prior art methods have produced phenol-formaldehyde and phenol-urea foams, but again, such foams have a compact cellular structure, but not the sufficiently small cell sizes necessary for high-energy physics applications.

Such materials do not exhibit the desired low density, combined with the ultrafine cell structure characteristic of aerogels, and are thus not suitable for applications in high energy physics or as parts for inertial confinement fusion targets. The current production of low density materials with ultrafine pore sizes (less than or equal to 1000 Å) has largely been limited to aerogel technology, particularly to silica aerogels.

Silica aerogels are being developed as superinsulating material for double pane windows. Oganic aerogels would be expected to have an even lower thermal conductivity and, thus, provide less heat loss in insulating applications.

The presence of silicon, having an atomic number (Z) of 14, in silica aerogel systems often limits its effectiveness for many applications, such as in high energy physics or as parts for inertial confinement fusion targets and the like, where a low number for Z (atomic number) is preferred. Pure organic foams or aerogels, consisting of mostly carbon (Z=6), and hydrogen (Z=1) with some oxygen (Z=8), are suitable for such applications. The organic composition of MF aerogels provides them with a low average atomic number, making them ideal candidates for high energy physics applications and as parts for inertial confinement fusion targets.

Other potential applications for the MF aerogels of this invention include, but are not limited to, uses as catalyst supports, permselective membranes, thermal insulators, gas filters in chemical processing chromatographic packings, sensors, lenses, solar collectors and impedance matching devices. Future applications could include lightweight insulative clothing, fire-retardant architectural materials, high resolution sonic detectors, autofocus cameras, dielectric spacer material for electronics and magnetics, acoustic and thermal absorbers for packaging valuable temperature-sensitive products.

Accordingly, it is an object of the present invention to provide a low density organic aerogel which exhibits continuous porosity and ultrafine cell size and is not only transparent, but also essentially colorless, that is, non-absorptive in the visible spectrum.

Another object of the invention is to provide a new synthetic route for the production of organic aerogels. The aqueous, sol-gel polymerization of melamine with formaldehyde requiring a PH change, followed by supercritical extraction, lead to the formation of a new type of organic aerogel. Low densities (from about 0.1 to about 0.8 g/cc), high surface areas (about 1000 m$^2$/g) and optical clarity are only a few of the characteristics of the MF aerogels of this invention.

Additional objects, advantages and novel features of the invention, together with additional features contributing thereto and advantages accruing therefrom will be apparent from the following description and the accompanying illustration of one or more embodiments of the invention and the description of the preparation techniques therefor, as described hereinafter. The objects and advantages of the invention may be realized and attained by means of the instrumentalities and combinations particularly pointed out in the appended claims.

SUMMARY OF THE INVENTION

To achieve the foregoing and other objects, and in accordance with the purpose of the present invention as embodied and broadly described herein, one aspect of the present invention provides, a synthetic route for the production of melamine-formaldehyde aerogels which are essentially colorless, exhibit optical clarity, low densities, continuous porosity and ultrafine cell size and a Z=8 or less, as well as MF aerogels with such characteristics. The method broadly comprises the sol-gel polymerization of melamine with formaldehyde to form an organic aerogel which is both colorless and transparent. The polycondensation of formaldehyde with melamine is carried out in water in the presence of a base catalyst. Sodium hydroxide is a suitable base catalyst, although other catalysts may be employed. The slurry is heated to form a clear solution and upon cooling acidified, wherein the acid used is preferably hydrochloric or trifluoroacetic acid among others. To form transparent gels when formaldehyde and melamine monomers are used as starting materials, the pH of the solution is maintained in a range of from about 1 to about 2, preferably between about 1.5 and about 1.8. Outside of that pH range, translucent or opaque gels are formed. When a low molecular weight melamine-formaldehyde polymer is used as the starting material, the pH range can be broadened to from about 1 to about 2.5.

A schematic diagram of the melamine-formaldehyde reaction is shown in FIG. 1. In preparation for supercritical drying, the gels can be placed in an appropriate basic solution to neutralize the acidic solution within the pores of the gel; however, such a neutralization step is not necessary when a low molecular weight melamine-formaldehyde polymer is used as the starting material. The gel is then exchanged into a suitable organic solvent and supercritically dried with carbon-dioxide.

The melamine-formaldehyde aerogels can be prepared from melamine and formaldehyde monomers or from melamine-formaldehyde low molecular weight polymers, preferably CYMEL 385 [American Cyanamid, Wayne, N.J. (USA)] and 714 [Monsanto Chem. Co., St. Louis, MO (USA)].

The MF aerogels of this invention are stable, non-absorptive in the visible spectrum, transparent and exhibit low densities (from about 0.1 to about 0.8 g/cc), high surface areas (about 1000 m$^2$/g), and have ultrafine cell pore sizes (less than or equal to 1000 A, more preferably less than or equal to 500 A). Their organic composition provides a low average atomic number that provides certain advantages over conventional inorganic aerogels, such as, silica or alumina aerogels.

DETAILED DESCRIPTION OF THE INVENTION

The present invention is directed to melamine-formaldehyde (MF) aerogels, which are essentially colorless and transparent; have low densities, preferably in the range of about 0.1 to about 0.8 g/cc, more preferably from about 0.1 to about 0.75 g/cc; have high surface areas, from about 900 m$^2$/g to about 1100 m$^2$/g, generally about 1000 m$^2$/g; and have ultrafine cell/pore size, preferably less than about 1000 A, and more preferably less than or equal to 500 A.

Further, the invention is directed to methods for producing such MF aerogels and MF aerogels produced by such methods.

The aqueous, sol-gel polymerization of melamine with formaldehyde, followed by supercritical extraction, leads to the formation of a new type of organic aerogel— the MF aerogel. Synthetic conditions, for example, the reaction time and pH, affect the density, transparency, and microstructure of the resultant MF aerogels. Unlike the previous organic aerogels based upon resorcinol-formaldehyde, the MF aerogels are both transparent and colorless.

Figure 1:
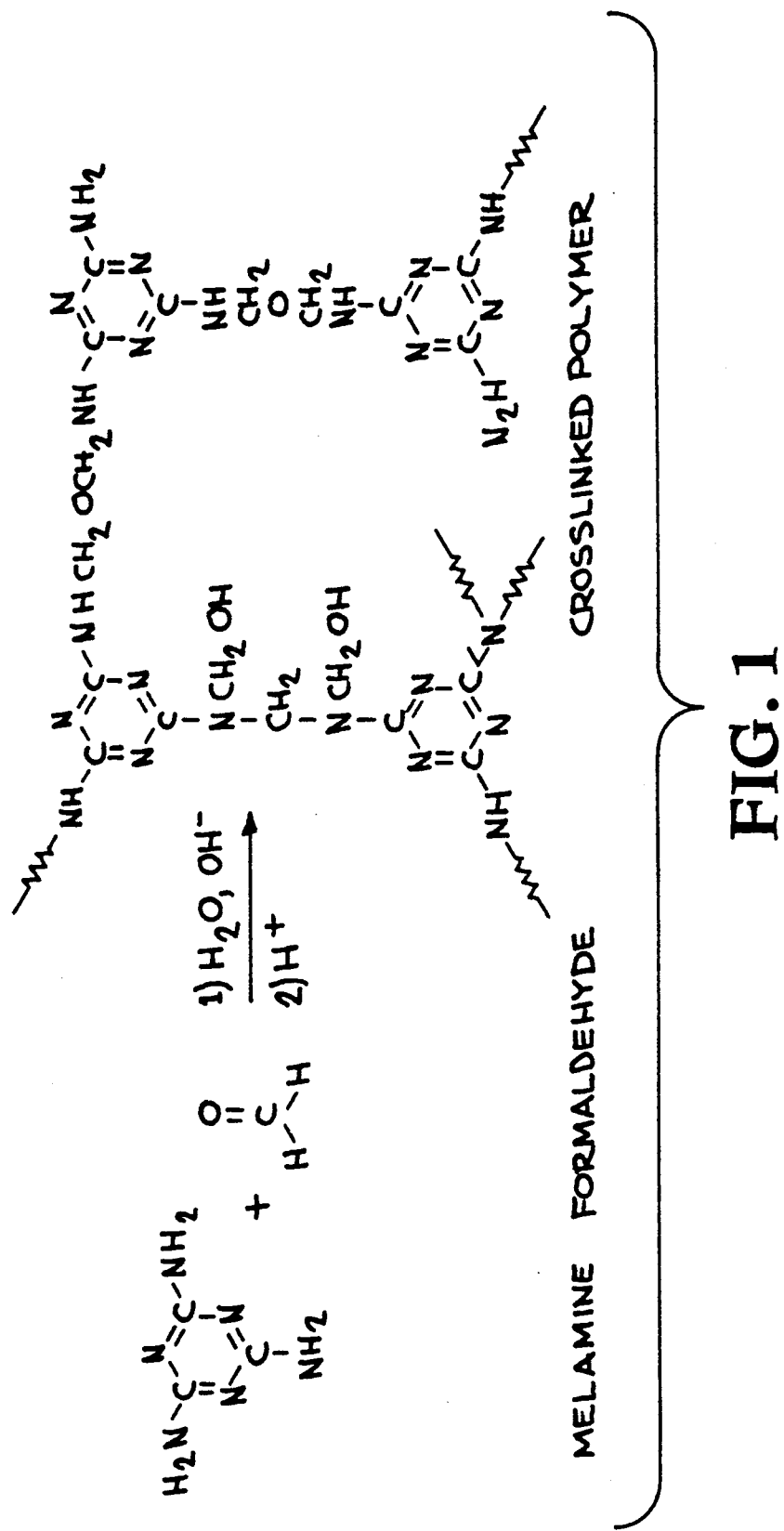
FIG. 1 is a schematic diagram of the reaction of melamine with formaldehyde to form a cross-linked polymer network.

Melamine is a hexafunctional monomer capable of reaction at each of the amine hydrogens. Under alkaline conditions, formaldehyde adds to the above positions to form hydroxymethyl ($-CH_2OH$) groups. In the second part of the polymerization, the solution is acidified to promote condensation of these intermediates, leading to gel formation. The principal crosslinking reactions include the formation of (1) diamino methylene ($-NHCH_2NH-$) and (2) diamino methylene ether ($-NHCH_2OCH_2NH-$) bridges [Blank, *J. Coatings Tech.*, 51 (656): 61 (1979); and Updegraff, "Amino Resins," in *Encyclopedia of Polymer Science* (2d ed.), Vol. 1: 752-789 (John Wiley & Sons, 1985)]. FIG. 1 outlines the MF reaction and depicts the formation of a crosslinked polymer network.

Methods to produce such MF aerogels comprise reacting melamine and formaldehyde in an appropriate ratio, preferably from about 3 to about 6 moles of formaldehyde with about 1 mole of melamine, more preferably about 3.7 moles of formaldehyde to about 1 mole of melamine, to form a crosslinked network. An excess of formaldehyde is preferably used to maximize the crosslinking density of the gel.

In addition to forming MF aerogels from melamine and formaldehyde monomers, low molecular weight polymers that are commercially available can be employed. Preferred polymers include CYMEL 385 [a partially methylated melamine-formaldehyde resin with a methoxymethyl-methylol functionality; commercially available from American Cyanamid Company, Wayne, NJ (USA)] and Resimene ® 714 [a partially methylated melamine-formaldehyde resin also with a methoxymethyl-methylol functionality; commercially available from Monsanto Chemical Co., St. Louis, MO (USA).] Example 2 provides a representative method of making MF aerogels with such resins.

A method of producing MF aerogels comprises reacting melamine and formaldehyde monomers in a predetermined ratio, in the presence of a base catalyst, preferably sodium hydroxide, in an aqueous solution at an elevated temperature (because of melamine's limited water solubility), preferably about 65° C. to about 75° C., more preferably about 70° C., for a sufficient amount of time, preferably about 5 to about 20 minutes, more preferably about 10 to about 15 minutes, to form a clear solution. The solution is allowed to cool, preferably to about 40° C. to about 50° C., more preferably to about 45° C., and then sufficient acid, preferably hydrochloric acid (HCl) or trifluoroacetic acid (TFAA), preferably concentrated hydrochloric acid (HCl), more preferably at a concentration of about 36.5%, is added to cause the solution to be in an acidic pH range as measured at room temperature, preferably from about 1 to about 2, more preferably from about 1.5 to about 1.8 when melamine and formaldehyde monomers are employed, and preferably from about 1 to about 2.5 when low molecular weight melamine-formaldehyde polymers are used. If the solution is heated too long or the pH is not properly adjusted, a white precipitate can be formed, and a gel will not be formed.

To form transparent gels, the pH of the solution needs to be in the range of from about 1 to about 2, or about 1 to 2.5 (as indicated above depending upon the starting material), when measured at 23° C. Outside of those pH ranges, translucent or opaque gels are formed. The pH of the MF solution appears to be the most critical parameter in controlling the optical clarity of the dried aerogel. Gels prepared from monomers at a pH of about 1.7 resulted in transparent aerogels, whereas gels prepared at a pH of about 0.7 led to opaque aerogels. Infrared (IR) spectra of those two aerogels indicated that the absorption rates and intensity ratios thereof were identical. Solid state nuclear magnetic resonance (NMR) of these aerogels also showed identical chemical shifts and relaxation parameters. Thus, based upon the IR and NMR data, it appears that the solution pH does not affect the type or degree of crosslinking in the aerogels.

Depending upon the percentage of solids in the pH adjusted solution (acidic), it may be necessary to reheat the solution to a temperature preferably from about 40° C. to about 95° C. in a sealed container to form a gel.

The pH adjusted, melamine-formaldehyde solution is then poured into an appropriate container, preferably glass vials, sealed and cured under various conditions. Solutions that contained greater than or equal to 20% reactants gelled in less than 48 hours at room temperature; whereas solutions containing about 7% reactants gelled in approximately 4 weeks at a cure temperature of from about 85° C. to about 95° C. It was found that at high reactant concentrations, that is, from about 15% to about 40% reactants, a preferred curing pattern was for about 50° C. for about two days followed by a curing time of about five days at an elevated temperature that is less that the boiling point of water, preferably about 95° C.

As the reaction progresses, all formulations acquire a light blue haze. That haze is associated with Rayleigh scattering from MF "clusters" generated in solution. The clusters contain surface functional groups, for example, $-CH_2OH$, that eventually crosslink to form a gel. The aggregation and crosslinking processes show a strong pH dependence.

In preparation for supercritical drying, the crosslinked gels that are prepared from melamine and formaldehyde monomers are removed from their containers and placed in a basic solution, preferably ammonium hydroxide, to neutralize the HCl within their pores. Such a neutralization step was found not to be necessary when low molecular weight melamine-formaldehyde polymers are used as the starting material, and may not be necessary when melamine and formaldehyde monomers are used as the starting materials. The gel is then solvent exchanged to replace the water retained in the gel pores with a suitable organic solvent. Such solvents include, but are not limited to, methanol, acetone, isopropanol and amyl acetate, wherein acetone is the preferred solvent. For example, the gels are exposed to a 50:50 mixture of acetone:water, followed by a 75:25 mixture and finally 100% acetone. Multiple exchanges with fresh acetone are used to remove residual water from the gels.

After the solvent exchange, the gel is dried by supercritical drying, using carbon dioxide, and characterized, for example, in terms of density, microcellular structure or pore size and spectral characteristics. Details concerning the supercritical extraction procedure can be found in Pekala and Kong, *J. de Physique, Colloque*

Supp., 50(4): C4-33 (1989) and Pekala, *J. Mat. Sci.* 24: 3221 (1989). Briefly and representatively, wherein carbon dioxide is the supercritical fluid, the solvent-filled, preferably acetone-filled gel, is placed in a temperature-controlled, pressure vessel (for example, Watford, England), which vessel is then filled with liquified carbon dioxide. The carbon dioxide is completely substituted for the acetone in the pores of the gel through multiple exchanges At that point, the vessel is heated above the critical temperature ($T_c = 31°$ C.) and brought to a pressure above the critical pressure ($P_c = 1100$ psi) of carbon dioxide. The pressure is then slowly bled from the vessel while the temperature is maintained above the critical point. At atmospheric pressure, the MF aerogel is removed from the vessel.

The MF aerogels so formed are transparent, indicative of their ultrafine cell/pore size (less than 1000 A, preferably less than 500 A). All samples were stored in dessicators to inhibit moisture absorption.

Figure 2:
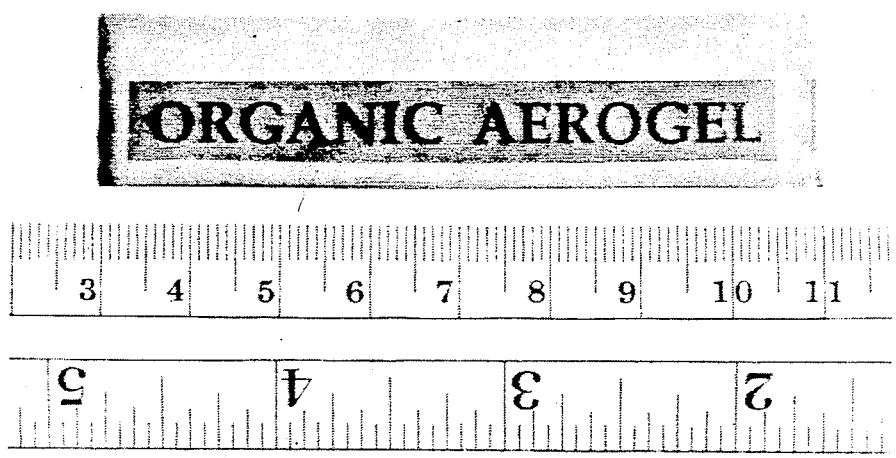
FIG. 2 shows a melamine/formaldehyde (MF) aerogel after supercritical drying. The aerogel is 17 mm thick, colorless and transparent with a density of 0.3 g/cc.

MF aerogels have been synthesized with densities from about 0.1 to about 0.75 g/cc. FIG. 2 shows an MF aerogel after supercritical drying. The aerogel is both colorless and transparent. The latter property indicates that the cell/pore size and characteristic particle size (referred to as "cluster" size in solution) are less than 1/20th the wavelight of visible light. The optical clarity of MF aerogels is equivalent to that of many silica aerogels.

Figure 3:
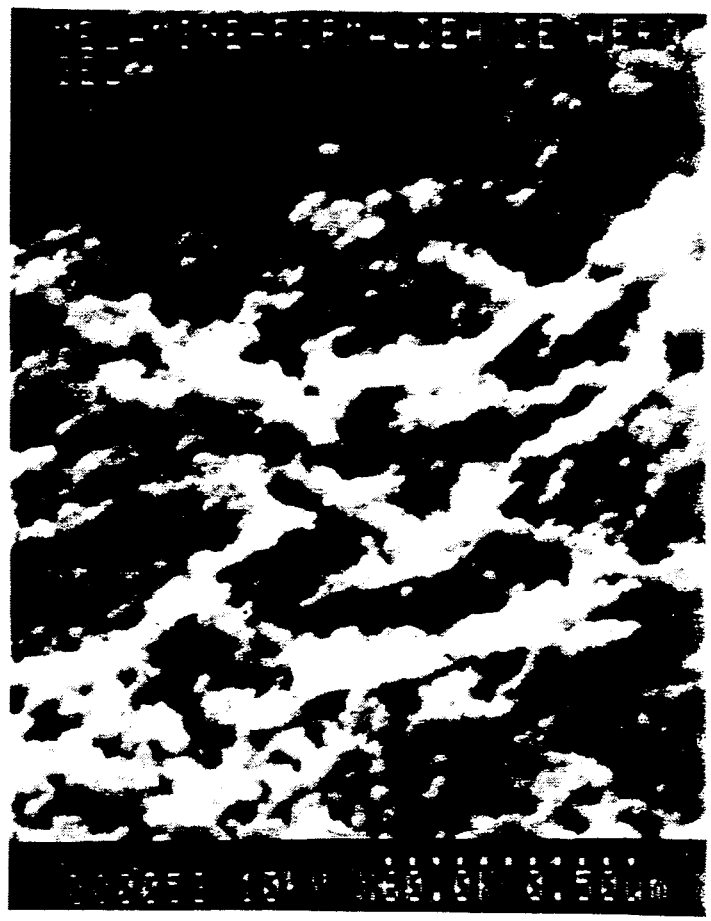
FIG. 3 is a scanning electron micrograph showing the fracture surface of a MF aerogel. The micrograph reveals that the aerogel is composed of interconnected particles or fibers (cross-linked polymeric chains) with diameters less than 500 angstroms (A).

The fracture surface of an MF aerogel is shown in FIG. 3. Scanning electron microscopy (SEM) reveals that the aerogel is composed of interconnected particles with diameters less than 500 A. At that magnification, it is difficult to discern whether the particles are composed of even smaller subunits. Measurements of surface area by the Brunauer, Emmett and Teller nitrogen absorption method (BET) gave a surface area of 970 m$^2$/g.

Aerogel moduli were measured in uniaxial compression with an Instron machine [Model #1125; Instron Corp., 100 Royall Street, Canton, MA 02021 (USA)]. Tests were performed at a strain rate of 0.1%/second under ambient conditions. Specimens were machined as $1 \times 1 \times 1$ cm$^3$ cubes with a modified end mill. Great care was taken to ensure that specimens were machined with flat, smooth surfaces and plane-parallel opposing faces. Densities were measured just prior to testing, and the compressive modulus was derived from the linear region of the stress-strain curve.

In order to investigate the structure-property relationships of the MF aerogels, compressive moduli were examined as a function of density and compared to silica aerogels. As expected, the modulus increases with aerogel density. The linear log-log plot in each case demonstrates a power-low density dependence that has been observed in many other low density materials. That relationship is expressed as $E = c\rho^n$, where $\rho$ is the bulk density, c is a prefactor (constant), and n is a non-integer scaling exponent that actually ranges from 2–4 [Gibson and Ashby, *Proc. Royal Soc. Land.*, 382 (A): 43 (1982)].

For silica aerogels, the scaling exponent shows a strong dependence upon catalyst conditions [Woignier et al., *J. Mat. Res.*, 4 (3): 688 (1989); LeMay et al., *Pac. Polym. Prots.*, 1: 295 (1989)]. Transparent MF aerogels have a scaling exponent of 3.3 plus or minus 0.3 and moduli that approximate those acid-catalyzed silica aerogels. That data suggest similar microstructures for the two aerogels, even though MF aerogels are organic and silica aerogels are inorganic. MF aerogels, thus, were found to be similar to silica aerogels in terms of their microstructure, surface area and mechanical properties.

MF aerogels have moduli that are similar to RF aerogels synthesized under high catalyst conditions [Pekala et al., in *Mechanical Properties of Porous and Cellular Materials* (Gibson et al. eds.), MRS Symp. Proc., 207 (in press)]. The scaling exponent of MF aerogels differs from RF aerogels, which is not surprising because MF aerogels are produced under highly acidic conditions, whereas RF aerogels are base catalyzed. The higher exponent implies a different microstructure as would be expected from the cluster-cluster growth pathway of the MF polymerization.

The following representative examples are illustrative of the principles of the present invention and describe preferred embodiments thereof. They are not to be construed as limiting the invention in any manner or to any precise form.

EXAMPLE 1

The polycondensation of 3.7 moles of formaldehyde [37.6%; methanol stabilized; J. T. Baker, Phillipsburg, NJ 08865 (USA)] with 1 mole of melamine [99+%; Aldrich Chemical Co., 1001 W. St. Paul Ave., Milwaukee, WI 53233 (USA)] was carried out in deionized and distilled water using 10–100 millimoles of sodium hydroxide as a base catalyst. The slurry formed was heated for 10–15 minutes at 70° C. to form a clear solution. This solution was allowed to cool to 45° C., at which time, concentrated hydrochloric acid (HCl) (36.5%) was added. If the solution was heated too long at 70° C. or the pH was not properly adjusted a white precipitate was formed and a gel could not be obtained. To form transparent gels, the pH of the melamine-formaldehyde (MF) solution was required to be from about 1 to about 2 more preferably from about 1.5 to about 1.8 when measured at 23° C. Outside of that range, translucent or opaque gels were formed.

The pH adjusted, melamine-formaldehyde solution was poured into $23 \times 85$ mm glass vials, sealed, and cured under various conditions. Solutions containing greater than or equal to 20% reactants gelled in less than 48 hours at room temperature, whereas solutions containing 7% reactants gelled in approximately 4 weeks at a cure temperature from about 85° C. to about 950° C. As the reaction progressed, all formulations acquired a light blue haze.

In preparation for supercritical drying, the crosslinked gels were removed from their glass vials and placed in an ammonium hydroxide solution to neutralize the HCl within the pores. The gels were then exposed to 50:50 mixture of acetone:water, followed by a 75:25 mixture, and finally 100% acetone. Multiple exchanges with fresh acetone were used to remove residual water from the gels.

The acetone-filled, MF gels were dried in a jacketed pressure vessel (Polaron Equipment Ltd., Watford, England) using carbon dioxide as the supercritical fluid ($T_c = 31°$ C.; $P_c = 1100$ psi). The carbon dioxide was completely substituted for the acetone in the pores of the gel through multiple exchanges. The vessel was heated above the critical pressure and temperature of carbon dioxide. The pressure was slowly bled from the vessel while the temperature was maintained above the critical point. At atmospheric pressure, the MF aerogels were removed from the vessel. [Further details concerning the supercritical extraction procedure can be found in Pekala and Kong, *J. de Physique, Colloque Suppl.*, 50 (4): C4-33 (1989) and in Pekala, *J. Mat. Sci.*, 24: 3221 (1989).]

The MF aerogels removed from the pressure vessel were transparent, indicative of the ultrafine cell size (less than 500 A) of these porous solids. All samples were stored in dessicators to inhibit moisture absorption.

EXAMPLE 2

To make an approximately 200 mg/cc melamine-formaldehyde aerogel with a commercially available melmine-formaldehyde polymer, the following formulation is used:

12.5 g of Resimene$^R$ 714 (Monsanto Chem. Co., St. Louis, MO);
52.5 g of deionized and distilled water; and
about 2 ml of concentrated hydrochloric acid (HCl) to bring the pH to about 1.75.

The solution is stirred and poured into glass molds. The formulation is cured for two days at about 50° C. followed by about five days at about 95° C.

The solvent exchange procedure except without the neutralization step, as outlined above in Example 1, is followed and the gel is supercritically dried from carbon dioxide. A transparent aerogel results.

It has thus been shown that melamine formaldehyde aerogels of microcellular structure are easily produced in low densities ranging from about 0.1 to about 0.8 g/cc. These melamine formaldehyde aerogels are essentially colorless, transparent, and have high surface areas and ultrafine cell/pore sizes.

The foregoing description of a preferred embodiment of the invention has been presented for purposes of illustration and description only. It is not intended to be exhaustive or to limit the invention to the precise form disclosed, and obviously many modifications and variations are possible in light of the above teaching. The particular embodiment was chosen and described in order to best explain the principles of the invention and its practical application thereby to enable others skilled in the art to best utilize the invention in various embodiments and with various modifications as are suited to the particular use contemplated. It is intended that the scope of the invention be defined by the claims appended hereto. All references herein cited are hereby incorporated by reference.

I claim:

1. A composition of matter comprising a low density, melamineformaldehyde (MF) aerogel which s transparent and essentially colorless, wherein the cell/pore sizes of the aerogel are less than or equal to 500 angstroms (A) and the density of the aerogel is from about 0.1 to 0.8 g/cc.

2. The composition of claim 1, wherein the aerogel has a surface area of about 1000 m$^2$/g.

3. The composition of claim 1, wherein the aerogel has a light blue haze.

4. A composition according to claim 1 wherein the density is from about 0.1 to about 0.75 g/cc.

5. A composition according to claim 1 wherein the aerogel is composed of interconnected particles or fibers with diameters less than 500 angstroms (A).

6. A melamine-formaldehyde aerogel having cell/pore sizes of less than or equal to 500 angstroms (A) and a density of from about 0.1 to about 0.8 g/cc produced by a method comprising the steps of:
   a) mixing formaldehyde and melamine in a predetermined ratio wherein there is an excess of formaldehyde in water in the pressure of a base catalyst;
   b) heating the mixture to a predetermined temperature for a sufficiently long period of time to form a clear solution;
   c) allowing the solution to cool to a predetermined temperature and then adding a sufficient amount of an acid to make the solution acidic;
   d) allowing the acidic melamine-formaldehyde solution to cure for a sufficient time at a predetermined temperature to
   e) placing the gel in a basic solution to neutralize the acid within the pores of the gel;
   f) replacing the aqueous solution within the pores of the gel with a suitable organic solvent; and
   g) critical point drying the gel.

7. A melamine-formaldehyde aerogel according to claim 6:
   a) wherein the formaldehyde and melamine are mixed in a ratio from about 3:1 to about 6:1 moles in the presence of from about 10 to about 100 millimoles of sodium hydroxide;
   b) wherein the mixture is heated in step (b) to a temperature of from about 65° C. to about 75° C. for a period of from about five to about twenty minutes;
   c) wherein the solution in step (c) is cooled to from about 40° C. to about 50° C. and concentrated hydrochloric acid is added to change the pH to from about 1 to about 2 when measured at about 23° C.;
   d) wherein before step (d), if desired, because of solids in the solution, the cooled acidic solution from step (c) is reheated in a sealed container to a temperature of from about 40° C. to about 95° C.;
   e) wherein the basic solution of step (e) is ammonium hydroxide;
   f) wherein the organic solvent of step (f) is acetone; and
   g) wherein in step (g) carbon dioxide is a supercritical fluid.

8. A melamine-formaldehyde aerogel according to claim 7 wherein instead of steps (a)-(c), a melamine-formaldehyde polymer is mixed with water and a sufficient amount f an acid to effect a pH of from about 1 to about 2.5 and wherein step (e) is omitted.

* * * * *